(12) United States Patent
Devereux et al.

(10) Patent No.: US 9,619,929 B2
(45) Date of Patent: Apr. 11, 2017

(54) FORWARD PIXEL KILLING

(71) Applicant: ARM Limited, Cambridge (GB)

(72) Inventors: Ian Victor Devereux, Cambridge (GB); Simon Jones, Bristol (GB); Frode Heggelund, Trondheim (NO); Toni Viki Brkic, Staffanstorp (SE)

(73) Assignee: ARM Limited, Cambridge (GB)

( * ) Notice: Subject to any disclaimer, the term of this patent is extended or adjusted under 35 U.S.C. 154(b) by 77 days.

(21) Appl. No.: 14/519,620

(22) Filed: Oct. 21, 2014

(65) Prior Publication Data

US 2015/0130802 A1 May 14, 2015

(30) Foreign Application Priority Data

Nov. 14, 2013 (GB) .................................. 1320108.2

(51) Int. Cl.
| | | |
|---|---|---|
| *G06T 15/40* | (2011.01) | |
| *G06T 15/50* | (2011.01) | |
| *G06T 1/60* | (2006.01) | |
| *G06T 15/00* | (2011.01) | |
| *G06T 11/40* | (2006.01) | |

(52) U.S. Cl.
CPC ............. *G06T 15/40* (2013.01); *G06T 1/60* (2013.01); *G06T 11/40* (2013.01); *G06T 15/005* (2013.01); *G06T 15/503* (2013.01)

(58) Field of Classification Search
CPC .................................................... G06T 15/40
See application file for complete search history.

(56) References Cited

U.S. PATENT DOCUMENTS

| | | | |
|---|---|---|---|
| 5,490,238 A | 2/1996 | Watkins | |
| 5,990,904 A * | 11/1999 | Griffin | .............. G06T 11/001 |
| | | | 345/631 |
| 7,064,771 B1 * | 6/2006 | Jouppi | .............. G09G 5/363 |
| | | | 345/506 |

(Continued)

FOREIGN PATENT DOCUMENTS

| | | |
|---|---|---|
| EP | 1 439 493 | 7/2004 |
| EP | 1 450 308 | 8/2004 |
| GB | 2460752 | 12/2009 |

OTHER PUBLICATIONS

Fatahalian, Kayvon, et al. "Reducing shading on GPUs using quad-fragment merging." ACM Transactions on Graphics (TOG). vol. 29. No. 4. ACM, 2010.*

(Continued)

*Primary Examiner* — Daniel Hajnik
(74) *Attorney, Agent, or Firm* — Nixon & Vanderhye P.C.

(57) ABSTRACT

A graphics processing apparatus and method of graphics processing is disclosed. Obscuration identification circuitry is configured to receive graphics fragments from rasterization circuitry and to identify an obscuration condition if a received graphics fragment, in combination with at least one previously received graphics fragment, will obscure at least one further previously received graphics fragment. Process killing circuitry is configured to prevent further processing occurring in the graphics processing apparatus with respect to the at least one further previously received graphics fragment if the obscuration identification circuitry identifies the obscuration condition.

17 Claims, 6 Drawing Sheets

(56) References Cited

U.S. PATENT DOCUMENTS

2002/0097241 A1\* 7/2002 McCormack ........... G06T 11/40
                                                    345/423
2004/0075654 A1   4/2004 Hsiao et al.
2008/0320230 A1\* 12/2008 Vishin ................. G06F 12/0817
                                                    711/141

OTHER PUBLICATIONS

"Hidden Surface Removal Algorithms", http://www.ibiblio.org/e-notes/3Dapp/Hidden.htm, (updated Oct. 10, 2001), 2 pages.
GB Search Report for GB Application No. 1320108.2, dated May 7, 2014, 3 pages.

\* cited by examiner

FORWARD PIXEL KILLING

CROSS-REFERENCE TO RELATED APPLICATIONS

This application claims priority to GB Application No. 1320108.2, filed on Nov. 14, 2013; the entire content of which is hereby incorporated by reference.

TECHNICAL FIELD

The present disclosure relates to data processing. More particularly, the present disclosure relates to graphics processing.

BACKGROUND

It is known that some aspects of graphics processing are computationally intensive tasks. For example, in a graphics processing system which receives graphics primitives, performs rasterization operations on those primitives to generate graphics fragments, and then performs rendering (shading) operations on those graphics fragments, the latter rendering (shading) operations are known to be particularly computationally intensive. For this reason, it is further known to seek to identify as early as possible in a graphics pipeline any graphics fragments which will not appear in the final display because they are overdrawn by other graphics fragments. If such hidden graphics fragments can be identified early in the graphics processing, in particular before the shading operations are carried out, then significant unnecessary processing can be avoided.

One aspect of identifying such hidden graphics fragments and avoiding further processing on them is known as forward pixel killing. This typically comprises the graphics processing system having depth testing capability which enables it to determine, for multiple graphics fragments corresponding to a particular display location, which of those graphics fragments will be front-most (and therefore should be fully processed and displayed) and the remaining graphics fragments which will be hidden (and therefore further graphics processing with respect to these hidden graphics fragments can be avoided). It is thus known to generate a "forward pixel kill" signal, when a graphics fragment is identified which is known to be front-most, which will cause the graphics processing system to abandon further processing with respect to any graphics fragments ahead of that front-most graphics fragment in the graphics pipeline.

An alternative approach to the problem of not performing graphics processing with regard to components which will ultimately be hidden is for the graphics primitives received by the graphics processing system to be fully sorted in terms of viewing depth (z sorting) such that the graphics processing can be performed in a strictly front-to-back order, and the graphics processing can simply be halted when all of the front-most components have been processed.

SUMMARY

Viewed from a first aspect, there is provided an apparatus for processing graphics primitives for display comprising:

rasterization circuitry configured to generate graphics fragments corresponding to the graphics primitives;

obscuration identification circuitry configured to receive the graphics fragments from the rasterization circuitry and to identify an obscuration condition if a received graphics fragment, in combination with at least one previously received graphics fragment, will obscure at least one further previously received graphics fragment; and process killing circuitry configured to prevent further processing occurring with respect to the at least one further previously received graphics fragment if the obscuration identification circuitry identifies the obscuration condition.

Viewed from a second aspect there is provided an apparatus for processing graphics primitives for display comprising:

means for generating graphics fragments corresponding to the graphics primitives;

means for receiving the generated graphics fragments;

means for identifying an obscuration condition if a received graphics fragment, in combination with at least one previously received graphics fragment, will obscure at least one further previously received graphics fragment; and means for preventing further processing occurring with respect to the at least one further previously received graphics fragment if the obscuration condition is identified.

Viewed from a third aspect there is provided a method of processing graphics primitives for display comprising the steps of:

generating graphics fragments corresponding to the graphics primitives;

receiving the graphics fragments;

identifying an obscuration condition if a received graphics fragment, in combination with at least one previously received graphics fragment, will obscure at least one further previously received graphics fragment; and preventing further processing occurring with respect to the at least one further previously received graphics fragment if the obscuration condition is identified.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
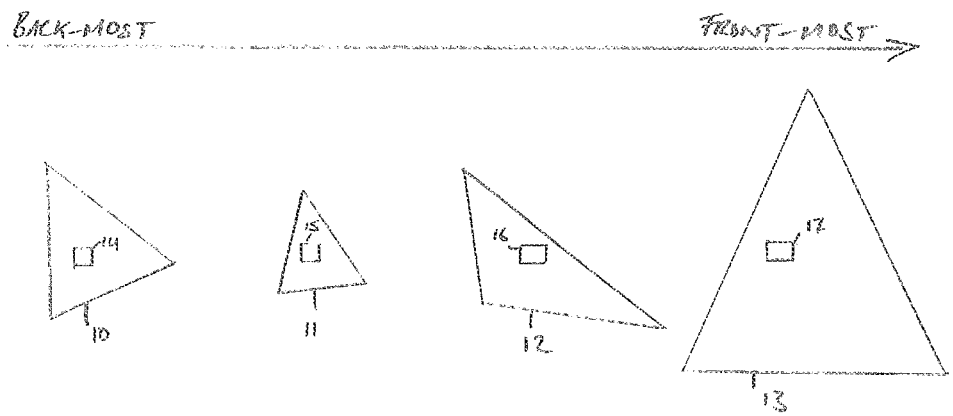
FIG. 1 schematically illustrates four graphics primitives and a graphics fragment generated for each of those graphics primitives, where the graphics primitives are associated with a range of depth values.

The present techniques recognise that circumstances exist in which a graphics fragment being handled by a graphics processing apparatus may be obscured, which has not been recognised by known prior art techniques. This circumstance arises when the graphics fragment is hidden by the combination of more than one other graphics fragment. For example, in the situation where the boundary of a first graphics primitive crosses the location of a particular graphics fragment at a deeper display depth, that graphics fragment may only be partially obscured by the graphics fragments which are generated for the first graphics primitive and accordingly would not be determined to be hidden. However, where a second graphics primitive has a boundary which is the same as, or at least sufficiently close to, the boundary of the first graphics primitive, it has been recognised that the combination of these two graphics primitives may result in that graphics fragment being fully hidden.

Accordingly, the present techniques provide obscuration identification circuitry which is able to determine if a graphics fragment which it has received from the preceding rasterization stage of the graphics processing apparatus, when considered in combination with at least one other graphics fragment which has been previously received (i.e. is further down the graphics processing pipeline), would cause another previously received graphics fragment to be obscured. This being the case, process killing circuitry is configured to prevent further graphics processing taking place with respect to the graphics fragment which is now known will be hidden by this combination of graphics fragments which have been received after it. More hidden graphics fragments can therefore be identified than is possible using prior art techniques and more unnecessary graphics processing can therefore be avoided.

The obscuration identification circuitry may be configured to identify the obscuration condition with reference to the received graphics fragment and several previously received graphics fragments, but in one embodiment the at least one previously received graphics fragment is a most recently received graphics fragment at a same display location as the received graphics fragment. This enables the obscuration identification circuitry to be provided in a more simple manner in which only one previously received graphics must be compared against. Indeed, in one embodiment, the obscuration identification circuitry is provided with storage in which a record of the most recently received graphics fragment for each display location is stored (for each display location in an image frame or, in tile-based graphics processing systems, for each display location in the tile).

The obscuration identification circuitry may seek to determine the obscuration condition with respect to graphics fragments at various stages in a graphics processing pipeline, but in one embodiment the apparatus further comprises an obscuration testing buffer configured to temporarily buffer the graphics fragments before sending the graphics fragments to shader circuitry. The provision of this obscuration testing buffer (also referred to herein as a forward pixel kill buffer or queue) thus provides a mechanism by which the obscuration identification circuitry has an easily accessible local storage in which it can readily identify other previously received graphics fragments in order to determine if the obscuration condition is met.

In one embodiment the obscuration testing buffer is configured to temporarily buffer the graphics fragments before sending the graphics fragments to shader circuitry. It is advantageous to temporarily hold the graphics fragments in the obscuration testing buffer before passing them on to the shader circuitry, because of the opportunity that this provides for identifying graphics fragments which can be killed before they enter the shader circuitry (and the more computationally intensive processing which occurs therein starts), and as identification in the obscuration testing buffer is likely to be simpler to implement than identification in the shader circuitry.

In some embodiments, the obscuration testing buffer is configured only to send the graphics fragments to the shader circuitry when the obscuration testing buffer has an occupancy above a predetermined threshold. By ensuring that the occupancy of the buffer is kept above this threshold, the opportunities for finding graphics fragments which can be killed are increased.

The obscuration identification circuitry may be configured to identify the obscuration condition with reference to graphics fragments at various stages in the graphics pipeline. For example, in one embodiment the obscuration identification circuitry is configured to identify the obscuration condition with reference to graphics fragments having a corresponding entry in the obscuration testing buffer. However, alternatively or in addition, the obscuration identification circuitry may be configured to identify the obscuration with reference to graphics fragments in the shader. Whilst this may bring further complexity due to the communication which is then required between the obscuration identification circuitry and the shader, it can provide further opportunities for identifying that the obscuration condition is met.

Once the obscuration condition has been identified as being met, the process killing circuitry can be configured to cause graphics fragments to be killed at a number of different stages of the graphics processing pipeline. In one embodiment the process killing circuitry is configured to prevent the further processing occurring with respect to graphics fragments in the obscuration testing buffer. Alternatively, or in addition, in one embodiment the process killing circuitry is configured to prevent the further processing occurring with respect to graphics fragments in the shader circuitry. Accordingly, the "kill" signal generated when the obscuration condition is met may find its target either in the obscuration testing buffer, or in the shader, or in both.

The obscuration identification circuitry may be configured to identify the obscuration condition in a number of ways, but in one embodiment the obscuration identification circuitry is configured to identify the obscuration condition with reference to a coverage mask associated with each graphics fragment, wherein the coverage mask indicates a portion of a graphics processing unit which is covered by that graphics fragment, wherein the graphics processing unit is a smallest graphics entity handled by the apparatus. The smallest graphics entity handled by the apparatus may for example correspond to a display pixel and indeed a graphics fragment may also correspond directly to a display pixel and in such a case the coverage mask indicates the portion of a pixel which is covered by the graphics fragment with which that coverage mask is associated. This may for example be the case where the apparatus is configured to super-sample, i.e. to determine coverage at a resolution finer than the pixel resolution.

The apparatus may however handle groups of pixels as a unit and in one embodiment the graphics processing unit is a multiple pixel block unit and the coverage mask indicates a portion of the multiple pixel block unit which is covered by that graphics fragment. In this case the coverage mask may simply indicate at a pixel-by-pixel level which pixels of the multiple pixel block unit which are covered by the graphics fragment or, as mentioned above, the apparatus may super-sample and the coverage mask may indicate at a granularity finer than that of individual pixels the portion of the multiple pixel block unit which is covered by the graphics fragment. Where a coverage mask is associated with each graphics fragment the obscuration identification circuitry may then make use of those coverage masks to determine whether the obscuration condition is met and in one embodiment the obscuration identification circuitry is configured to identify the obscuration condition if the coverage mask associated with the received graphics fragment combined with the coverage mask or masks of the at least one previously received graphics fragment together indicate complete coverage of the graphics processing unit. For example, this combination of the coverage masks may be effected by a bit-wise OR operation with respect to the bits of each mask.

Where the apparatus is configured to handle multiple pixel block units, the multiple pixel block unit may be a 2×2 pixel quad.

As mentioned above, the coverage for each graphics fragment may be indicated at a range of granularities and in one embodiment the coverage mask is configured to indicate the portion covered at a granularity finer than pixel size.

It may be the case that a particular graphics fragments must not be killed, for example where a particular operation associated with the processing of that graphics fragment must be allowed complete whether or not the graphics fragment is ultimately visible in the display. To allow for this possibility, in one embodiment the process killing circuitry is configured only to prevent further processing occurring with respect to the at least one further previously received graphics fragment if a no killing marker associated with the at least one further previously received graphics fragment is not set. Accordingly, if it is required for a particular graphics fragment to be fully processed, whether or not it will be ultimately visible in the display, the no killing marker in association with this graphics fragment can be set.

FIG. 1 schematically illustrates four graphics primitives 10, 11, 12 and 13 which may be received for processing by a graphics processing apparatus. These graphics primitives at least partially cover the same display location (x, y position in an image frame) to the extent that when these graphics primitives are rendered, a graphics fragment 14, 15, 16, 17 is generated for each which lies at the same display location. As indicated by the arrow in FIG. 1 these graphics primitives lie at differing depths in three dimensional space, with primitive 10 being the back-most and primitive 13 being the front-roost. Accordingly, it will be understood that where the graphics fragment 17 is fully opaque, only this graphics fragment will appear in the final two dimensional display, the other graphics fragments 14, 15 and 16 being hidden behind it. Ideally therefore, a graphics processing apparatus configured to generate an image frame for display including these four graphics primitives 10-13 would receive the graphics primitives in front-to-back order, such that when the graphics fragment 14-16 are generated, it can immediately be determined that these will be hidden behind the already generated graphics fragment 17 and therefore any further graphics processing with respect to these graphics fragments 14-16 can be abandoned. However, whilst it might be more efficient for the graphics primitives to be received in this order, a graphics processing apparatus does not typically have the luxury to determine the order in which its graphics primitives are received and accordingly more sophisticated techniques for determining hidden graphics fragments must be employed, as will be discussed in more detail below.

Figure 2:
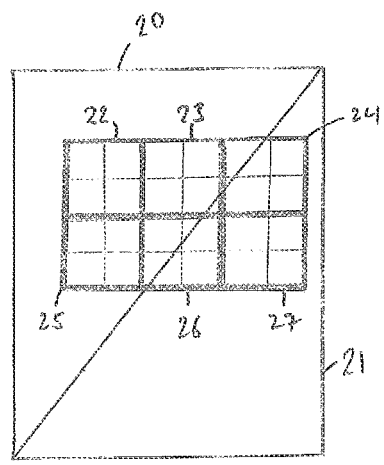
FIG. 2 schematically illustrates two graphics primitives with a shared boundary which crosses a number of graphics fragments.

FIG. 2 schematically illustrates two graphics primitives 20 and 21 which lie directly adjacent to each other to the extent that the hypotenuse of each of the triangles represented by graphics primitives 20 and 21 coincide. Also shown in FIG. 2 are a set of six graphic fragments 22-27. When the graphics primitives 20 and 21 are rasterized, graphics fragments at the position shown by graphics fragments 22-27 will be generated (along with further graphics fragments which are not illustrated for clarity). Considering the situation where a graphics fragment has previously been generated at position 22, when a graphics fragment is subsequently generated as part of the rasterization of graphics primitive 20 at the same position 22, if the graphics fragment generated for position 22 is determined to be in front of the previously generated graphics fragment at position 22, then it is known that the previously generated graphics fragment at position 22 can be killed since it will be fully obscured by the graphics fragment generated with respect to graphics primitive 20. By contrast, consider the graphics fragment at the position 26 where the boundary between graphics primitive 20 and graphics primitives 21 crosses this graphics fragment. Accordingly, in the situation where graphics fragments at position 26 are generated with respect to graphics primitives 20 and 21 which are further forward than any previously generated graphics fragments at this position, those graphics fragments previously generated for position 26 will be obscured by the graphics fragments generated for primitives 20 and 21 at this position. However, using prior art forward pixel killing techniques, previously generated graphics fragments at position 26 would not be killed, because a single graphics fragment will not be found which causes this obscuration. The techniques described herein however do enable this obscuration to be identified and therefore allow graphics fragments at a position such as 26 to be killed. Note that the above description with respect to FIG. 2 can be understood for the items 22-27 in terms of these being 2×2 "quads" of pixels. However, the same principles apply at a pixel level, i.e. where items 22-27 in FIG. 2 are considered to be individual pixels, and where the smaller boxes illustrated within each pixel thus indicate the super-sampling of those pixels.

Figure 3:
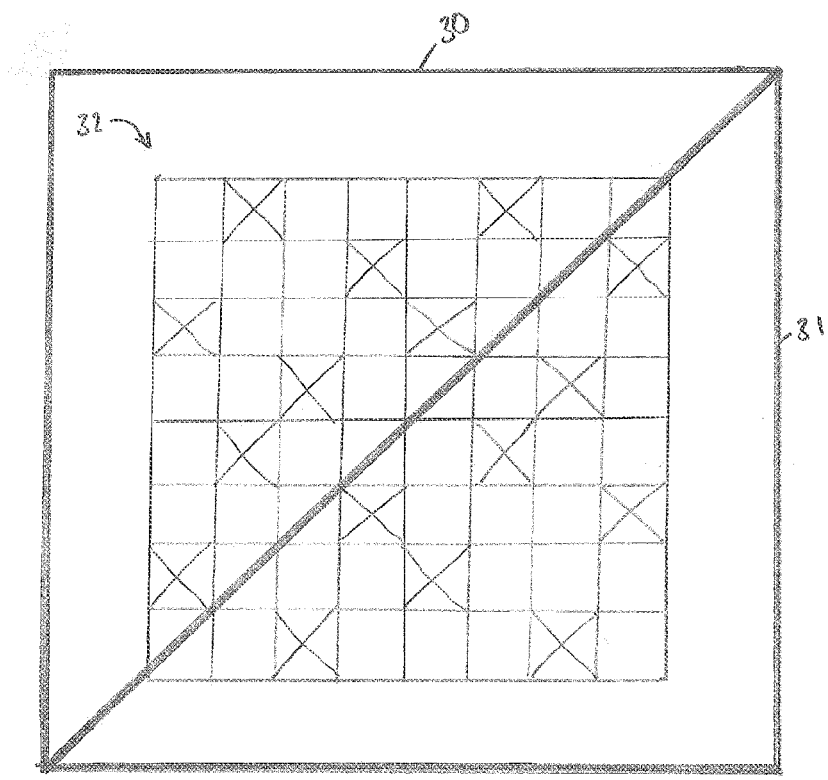
FIG. 3 schematically illustrates two graphics primitives which in combination fully obscure a super-sampled graphics fragment.

FIG. 3 further discusses this super-sampling, issue. In the illustration, two graphics primitives 30, 31 are again illustrated which share a common hypotenuse. Accordingly, it can be seen from the figure that graphics fragments generated for graphics primitives 30, 31 will (assuming they are further forward and fully opaque) fully obscure the set of 8×8 squares 32. The set of 8×8 squares 32 can be considered as a super-sampled single pixel, where the positions marked "X" indicate the points at which the pixel is super-sampled, with one graphics fragment then being generated corresponding to this one pixel. Alternatively the 8×8 set of squares 32 can for example be considered to be a 2×2 pixel quad, with the set of positions indicated "X" showing four sampling positions within each pixel. Whichever interpretation is taken of this figure, it can be seen that a graphics fragment corresponding to the grid 32 and lying at a deeper (further back) display depth with respect, to graphics fragments generated for graphics primitives 30, 31 can be determined to be fully obscured (i.e. covered by a full set of 16 X's), when such obscuration is determined with respect to the sampling points marked "X" derived from a combination of the coverage of a graphics fragment generated from graphics primitives 30 and the coverage of a graphics fragment from graphics primitives 31.

Figure 4:
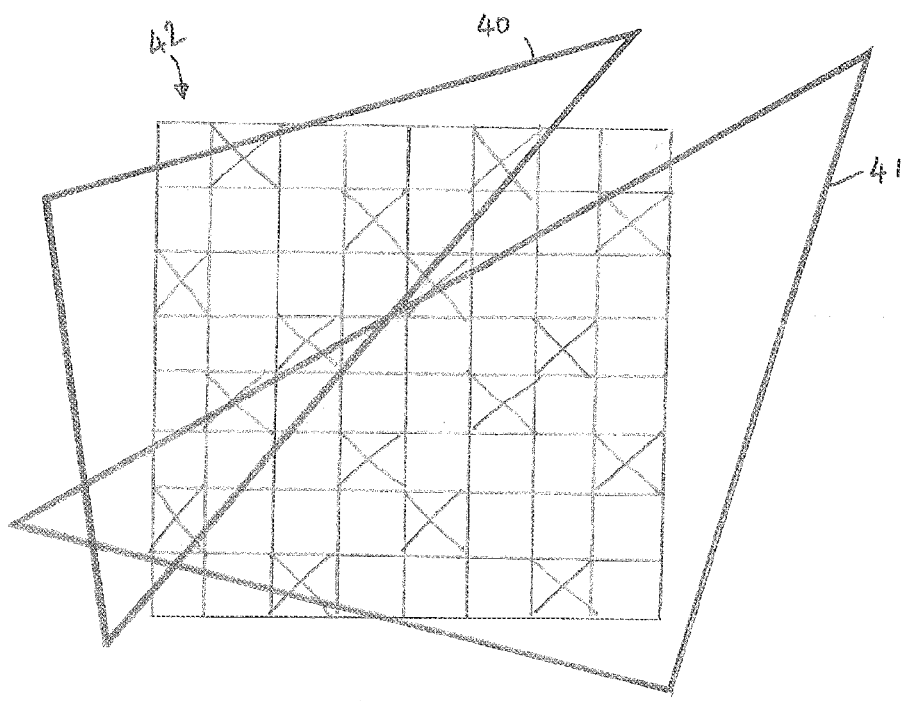
FIG. 4 schematically illustrates two graphics primitives which fully obscure a super-sampled graphics fragment despite those graphics primitives not sharing a boundary.

FIG. 4 schematically illustrates that it is not even necessary for the graphics primitives to share a boundary, and may even overlap. This is indeed the case for graphics primitives 40 and 41 which do not share a boundary and overlap with one another, yet the graphics fragment position 42 can be determined to be full covered by the combination of graphics fragments generated for graphics primitive 40 and graphics primitive 41, by virtue of the fact that together the graphics primitives 40 and 41 cover all sampling positions within the graphics fragment position 42.

Figure 5:
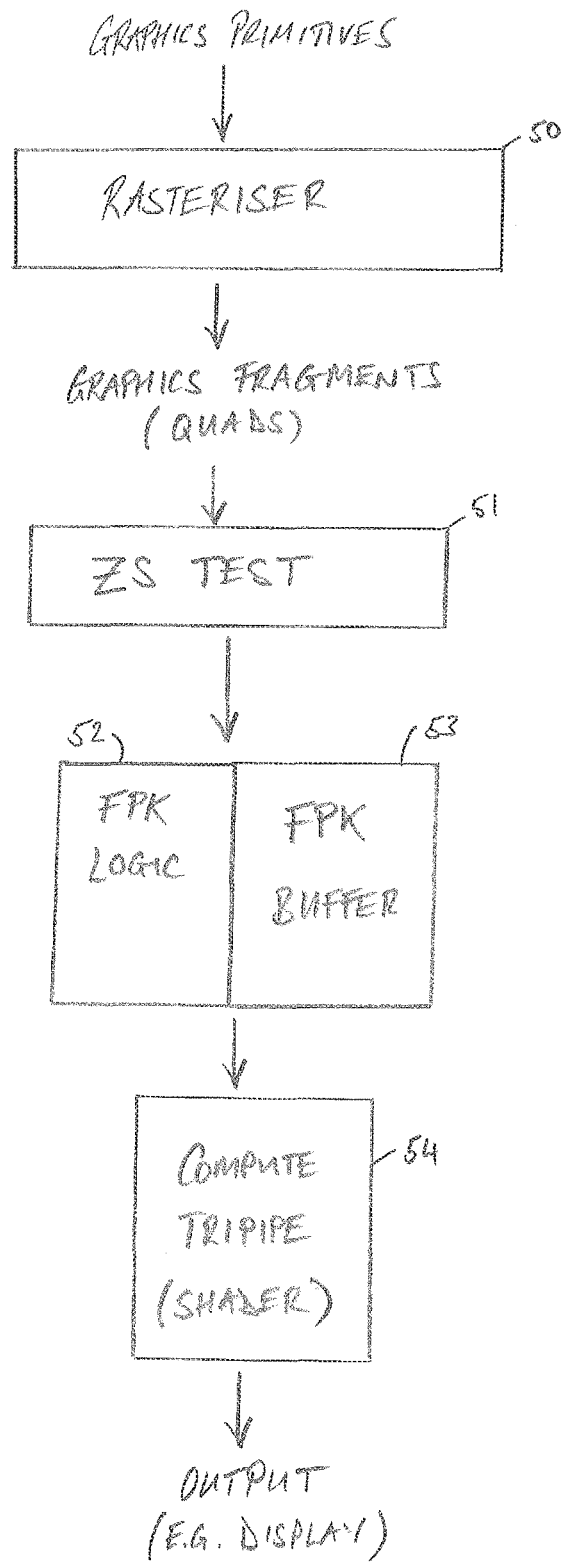
FIG. 5 schematically illustrates at a high level the major components of a graphics processing system in one embodiment.

FIG. 5 schematically illustrates the main stages of a graphics processing apparatus in one embodiment. Graphics primitives which are received are first passed to a rasteriser 50 which generates graphics fragment (quads) from those graphics primitives. These graphics fragments are then passed to a depth testing unit (ZS TEST) 51 which is configured to determine with respect to depth (Z) values stored in a depth buffer (not shown) whether a received graphics fragment is the front-Most graphics fragment yet received for that display position. Where it is not, the depth testing unit 51 can already abort any further processing with respect to this graphics fragment since it is known not to be the front-most graphics fragment for this display position and will therefore be hidden in the final display. Graphics fragments which survive this depth testing are then passed to the forward pixel killing (FPK) logic (circuitry) 52 and buffer 53. Since the graphics fragment received by FPK logic/buffer 52, 53 is known to be the front-most graphics fragment for this display position, the FPK logic 52 then seeks to abort any further processing with respect to other graphics fragments ahead of this graphics fragment in the pipeline which are then determined to be obscured. In particular, in the embodiment shown in FIG. 5, the FPK logic 52 is configured to determine whether a graphics fragment received from the depth testing stage 51 would obscure other previously received graphics fragments when taken in combination with another previously received graphics fragment. More detail of this is given in the description of the following figures. Assuming that a graphics fragment is not killed by the FPK logic 52, it is then passed on to the compute tripipe (shader circuitry) 54 where further graphics processing with respect to this graphics fragment is carried out and the full processed graphics fragment is then output, for example, for display, this typically taking place by accumulation in an image buffer before actually reaching the display.

Figure 6:
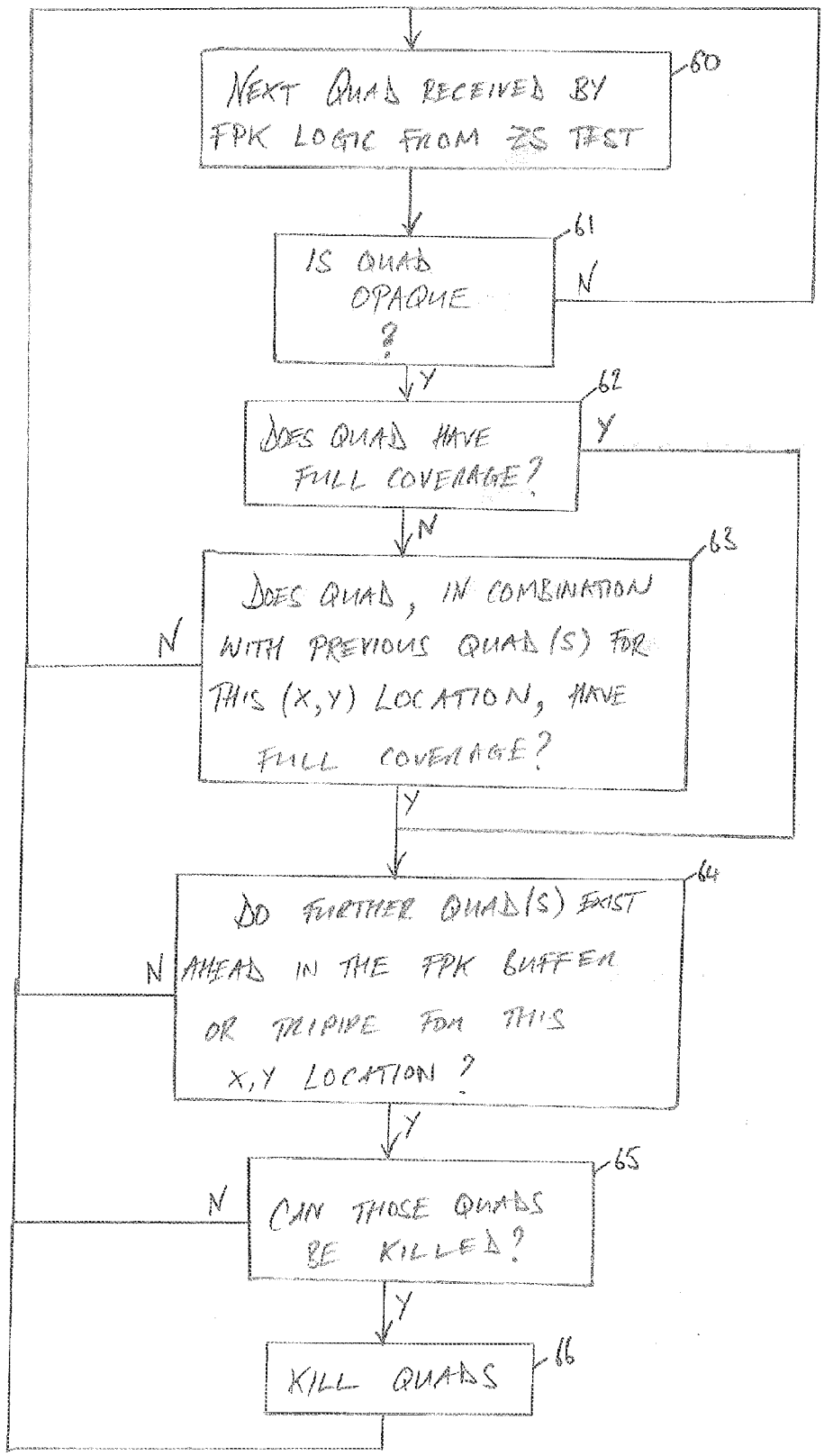
FIG. 6 schematically illustrates a series of steps which are taken in the method of one embodiment.

FIG. 6 schematically illustrates a sequence of steps which are taken in one embodiment. At step 60 the next quad (graphics fragment) is received by the FPK logic from the ZS test (depth testing unit). The FPK logic first determines, at step 61, if this quad is opaque. If it is not then it is already known that is cannot fully obscure another quad and the flow returns to step 60 for the next quad to be received. If however the quad is opaque then the flow proceeds to step 62 where it is determined if this quad has full coverage. This is done with reference to a coverage mask, which indicates the portion of a full quad unit which a given quad covers. If the quad does have full coverage then the flow proceeds directly to step 64. If however the quad is determined not to have full coverage then the flow proceeds to step 63 where it is determined if this quad, in combination with a previously received quad for the same display location, has full coverage. This is performed by an examination of the coverage masks associated with the current quad and those previous quads under consideration. If it is determined that even in combination full coverage is not achieved then the flow returns to step 60 where the next quad received is considered.

If however it is determined at step 63 that the combined coverage masks do produce full coverage for this quad location then the flow proceeds to step 64, where it is determined if there are any further quads further ahead in the graphics pipeline, in particular further ahead in the FMK buffer or tripipe for this display location. If there are not then the flow returns to step 60. If such quads are however found, then it is known that these quads will be obscured in the final display and it may be advantageous to prevent any further graphics processing taking place with respect to them. However, a final check at step 65 is made to determine if those quads are allowed to be killed. This is clue to that fact that it may be required for certain graphics processing operations associated with a certain quad to be allowed to be completed, even if it is known that the quad itself will not appear in the final display, for example where the shader has a particular side effect which must occur even if the fragments are later obscured. If it is determined that an identified, obscured quad should not be killed then the flow returns to step 60. If the quad or quads can be killed then this is done at step 66, whereafter the flow returns to step 60.

Figure 7:
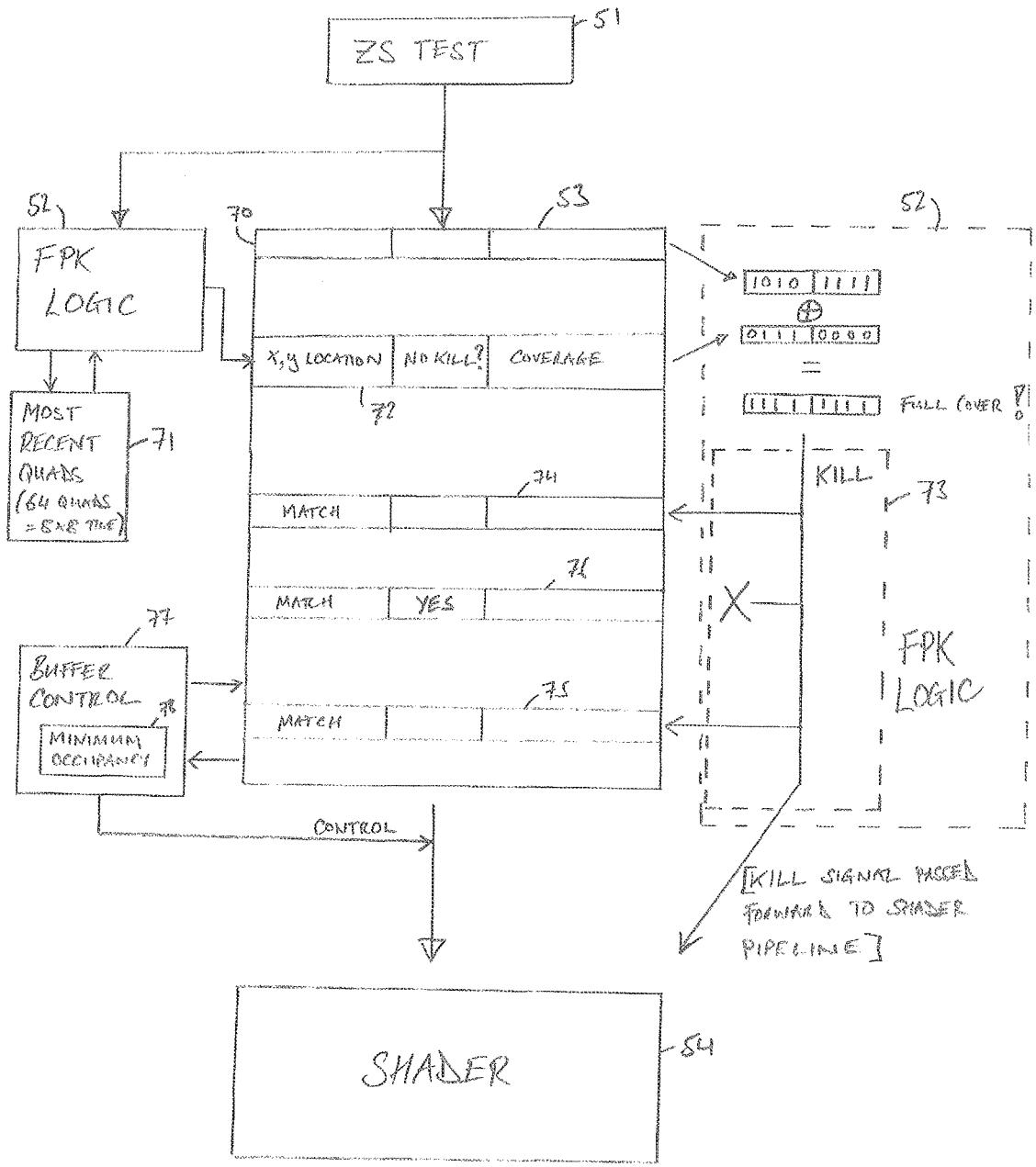
FIG. 7 illustrates forward pixel killing logic and a forward pixel killing buffer in one embodiment.

FIG. 7 schematically illustrates more detail of the FPK logic circuitry 52 and FPK buffer 53 (see FIG. 5). When a quad is received from the ZS test unit 51 (i.e. it has passed the depth test) a new entry 70 for this quad is made in the FPK buffer 53. This entry 70 (and indeed every other entry in the FPK buffer 53) enables the display (x, y) location of the corresponding graphics fragment to be determined, together with an indication of whether this graphics fragment is allowed to be killed by the FPK logic 52 ("no kill?"), and a coverage mask indicating the portion of a quad (2×2 pixel block) which is covered by this graphics fragment. The information relating to the newly received graphics fragment is also received by the FPK logic 52 which uses its display location information to perform a look up in a storage unit 71 which gives an indication of the most recent quad seen for this each display location.

In the illustrated embodiment, this storage unit 71 stores information relating to up to 64 quads, these corresponding to the set of 8×8 quads in a tile—this graphics processing system being a tile-based system. This provides the FPK logic 52 with an index into the FPK buffer 53 indicating an entry 72 which is the second most recently seen graphics fragment (quad) at the same display location as the most recently received graphics fragment (quad) 70. The FPK logic 52 is then configured to perform a bit-wise OR operation on the coverage mask indicated by these two entries to thus determine if the graphics fragment represented by entry 70 and the graphics fragment represented by entry 72 together provided full coverage at this display location. If such full coverage is established then a part 73 of the FPK logic 52 is configured to generate a "kill" signal and to determine further entries in the FPK buffer 53 corresponding to the same display location (74, 75, 76). Those entries where the "no kill" marker is not set (74, 75) are then caused killed and no further processing with respect to these graphics fragment will be carried out. The setting of the "no kill" marker for entry 76 presents this graphics fragment from being killed. As illustrated in FIG. 7 the kill signal is also passed forward to the shader pipeline (in association with the relevant display location as well) such that the shader 54 can abort graphics processing with respect to any graphics fragments at this display location. FIG. 7 also illustrates buffer control unit 77 which is configured to administer when entries in the FPK buffer 53 are allowed to be passed on to the shader 54. In particular, the buffer control 77 is configured only to allow graphics fragments to be passed forward to the shader 54 when the occupancy of the buffer (i.e. the number of active entries stored therein) exceeds a minimum occupancy 78. This improves the possibility for the FPK logic 52 to be able to kill entries in the FPK buffer 53.

Figure 8:
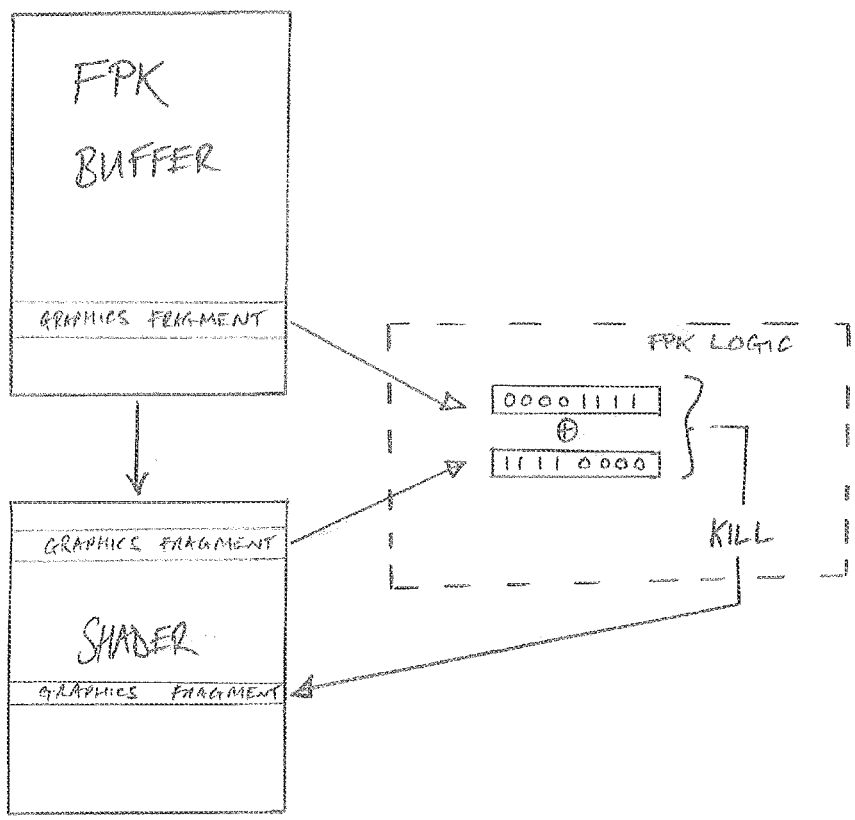
FIG. 8 schematically illustrates an obscuration condition being determined using a combination of graphics fragments, where one graphics fragment is in the forward pixel killing buffer and the other graphics fragment is already in the shader circuitry.
Figure 9:
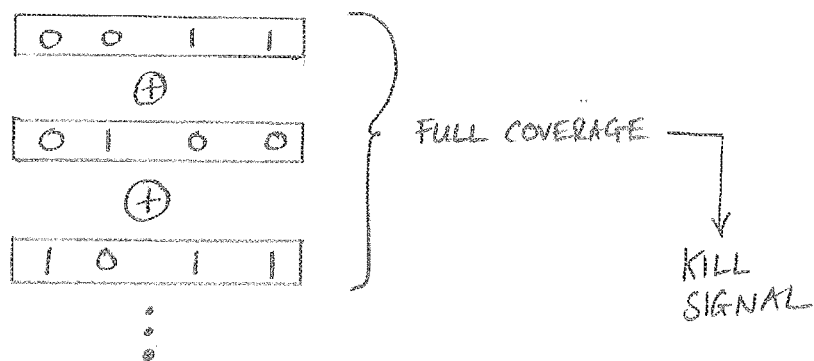
FIG. 9 schematically illustrates the obscuration condition being determined with respect to more than two graphics fragments.

FIG. 8 schematically illustrates a variant on the configuration described with reference to FIG. 7 in which the FMK logic is configured to determine the coverage by a combination of a graphics fragment in the FPK buffer and a graphics fragment which is already in the shader circuitry. Given that any further graphics fragment to be killed must therefore be further in the shader pipeline, the kill signal generated by the FPK logic is then only sent in this instance to the shader circuitry. FIG. 9 schematically illustrates a variant on the configuration discussed with reference to FIG. 7 in which the FPK logic is configured to determine full coverage with reference to more than two coverage masks.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. Apparatus for processing graphics primitives for display comprising:
   rasterization circuitry to generate graphics fragments corresponding to the graphics primitives;
   obscuration identification circuitry to receive the graphics fragments from the rasterization circuitry and to identify an obscuration condition when allowing a first received graphics fragment to be processed for display and allowing at least one previously received graphics fragment to be processed for display will result in at least one further previously received graphics fragment being obscured even when the first received graphics fragment and the at least one previously received graphics fragment do not share a boundary; and
   process killing circuitry to prevent further processing occurring with respect to the at least one further previously received graphics fragment when the obscuration identification circuitry identifies the obscuration condition,
   wherein the obscuration identification circuitry is responsive to reception of a next received graphics fragment to identify the obscuration condition when allowing the next received graphics fragment to be processed for display and allowing the first received fragment to be processed for display will result in the at least one further previously received graphics fragment being obscured even when the next received graphics fragment and the at least one previously received graphics fragment do not share a boundary,
   wherein each of the first received graphics fragment and the at least one previously received graphics fragment would not individually result in the at least one further previously received graphics fragment being obscured.

2. The apparatus as claimed in claim 1, wherein the at least one previously received graphics fragment is a most recently received graphics fragment at a same display location as the received graphics fragment.

3. The apparatus as claimed in claim 1, further comprising an obscuration testing buffer to store an entry corresponding to each graphics fragment received by the obscuration identification circuitry.

4. The apparatus as claimed in claim 3, wherein the obscuration testing buffer is arranged to temporarily buffer the graphics fragments before sending the graphics fragments to shader circuitry.

5. The apparatus as claimed in claim 4, wherein the obscuration testing buffer is arranged only to send the graphics fragments to the shader circuitry when the obscuration testing buffer has an occupancy above a predetermined threshold.

6. The apparatus as claimed in claim 3, wherein the obscuration identification circuitry is arranged to identify the obscuration condition with reference to graphics fragments having a corresponding entry in the obscuration testing buffer.

7. The apparatus as claimed in claim 4, wherein the obscuration identification circuitry is arranged to identify the obscuration condition with reference to graphics fragments in the shader circuitry.

8. The apparatus as claimed in claim 3, wherein the process killing circuitry is arranged to prevent the further processing occurring with respect to graphics fragments in the obscuration testing buffer.

9. The apparatus as claimed in claim 4, wherein the process killing circuitry is arranged to prevent the further processing occurring with respect to graphics fragments in the shader circuitry.

10. The apparatus as claimed in claim 1, wherein the obscuration identification circuitry is arranged to identify the obscuration condition with reference to a coverage mask associated with each graphics fragment, wherein the coverage mask indicates a portion of a graphics processing unit which is covered by that graphics fragment, wherein the graphics processing unit is a smallest graphics entity handled by the apparatus.

11. The apparatus as claimed in claim 10, wherein the graphics processing unit is a multiple pixel block unit and the coverage mask indicates a portion of the multiple pixel block unit which is covered by that graphics fragment.

12. The apparatus as claimed in claim 11, wherein the multiple pixel block unit is a 2×2 pixel quad.

13. The apparatus as claimed in claim 10, wherein the obscuration identification circuitry is arranged to identify the obscuration condition if the coverage mask associated with the received graphics fragment combined with the coverage mask or masks of the at least one previously received graphics fragment indicate complete coverage of the graphics processing unit.

14. The apparatus as claimed in claim 10, wherein the coverage mask is configured to indicate the portion covered at a granularity finer than pixel size.

15. The apparatus as claimed in claim 1, wherein the process killing circuitry is arranged only to prevent further processing occurring with respect to the at least one further previously received graphics fragment if a no killing marker associated with the at least one further previously received graphics fragment is not set.

16. Apparatus for processing graphics primitives for display comprising:

means for generating graphics fragments corresponding to the graphics primitives;

means for receiving the generated graphics fragments;

means for identifying an obscuration condition when allowing a first received graphics fragment to be processed for display and allowing at least one previously received graphics fragment to be processed for display will result in at least one further previously received graphics fragment being obscured even when the first received graphics fragment and the at least one previously received graphics fragment do not share a boundary; and means for preventing further processing occurring with respect to the at least one further previously received graphics fragment if the obscuration condition is identified, and wherein the means for identifying an obscuration condition is responsive to reception of a next received graphics fragment to identify the obscuration condition when allowing the next received graphics fragment to be processed for display and allowing the first received fragment to be processed for display will result in the at least one further previously received graphics fragment being obscured even when the next received graphics fragment and the at least one previously received graphics fragment do not share a boundary, wherein each of the first received graphics fragment and the at least one previously received graphics fragment would not individually result in the at least one further previously received graphics fragment being obscured.

17. A method of processing graphics primitives for display comprising the steps of:

generating graphics fragments corresponding to the graphics primitives;

receiving the graphics fragments;

identifying an obscuration condition when allowing a first received graphics fragment to be processed for display and allowing at least one previously received graphics fragment to be processed for display will result in the at least one further previously received graphics fragment being obscured even when the first received graphics fragment and the at least one previously received graphics fragment do not share a boundary;

preventing further processing occurring with respect to the at least one further previously received graphics fragment if the obscuration condition is identified; and wherein identifying the obscuration condition is responsive to reception of a next received graphics fragment when allowing the next received graphics fragment to be processed for display and allowing the first received fragment to be processed for display will result in the at least one further previously received graphics fragment being obscured even when the next received graphics fragment and the at least one previously received graphics fragment do not share a boundary, wherein each of the first received graphics fragment and the at least one previously received graphics fragment would not individually result in the at least one further previously received graphics fragment being obscured.

* * * * *